United States Patent
Hoshino

(10) Patent No.: US 10,638,545 B2
(45) Date of Patent: Apr. 28, 2020

(54) CONTINUOUS HEAT-TREATING APPARATUS FOR FOOD MATERIAL AND ENERGIZING AND HEATING METHOD

(71) Applicant: Frontier Engineering Co., Ltd., Tokyo (JP)

(72) Inventor: Hiroshi Hoshino, Tokyo (JP)

(73) Assignee: Frontier Engineering Co. Ltd., Tokyo (JP)

( * ) Notice: Subject to any disclaimer, the term of this patent is extended or adjusted under 35 U.S.C. 154(b) by 120 days.

(21) Appl. No.: 15/950,262

(22) Filed: Apr. 11, 2018

(65) Prior Publication Data
US 2019/0320500 A1    Oct. 17, 2019

(51) Int. Cl.
| | | |
|---|---|---|
| A23L 3/005 | (2006.01) | |
| A23L 9/10 | (2016.01) | |
| H05B 3/00 | (2006.01) | |
| A23L 5/10 | (2016.01) | |
| A23L 3/00 | (2006.01) | |
| A23L 3/01 | (2006.01) | |

(52) U.S. Cl.
CPC ............ *H05B 3/0009* (2013.01); *A23L 3/001* (2013.01); *A23L 3/01* (2013.01); *A23L 5/15* (2016.08); *A23L 9/12* (2016.08); *A23V 2002/00* (2013.01); *H05B 3/0023* (2013.01)

(58) Field of Classification Search
CPC .......... H05B 1/0258–0261; H05B 3/03; H05B 3/0009; A23L 9/00–24; A23L 5/15; A23L 3/00–005
See application file for complete search history.

(56) References Cited

U.S. PATENT DOCUMENTS

| | | | | |
|---|---|---|---|---|
| 4,672,627 A | * | 6/1987 | Dunn | H05B 3/03 373/38 |
| 5,690,978 A | * | 11/1997 | Yin | A23L 3/32 426/237 |
| 2013/0156639 A1 | * | 6/2013 | Paskalov | A61L 2/14 422/20 |
| 2013/0315574 A1 | * | 11/2013 | Pain | A23L 3/005 392/314 |
| 2016/0252271 A1 | * | 9/2016 | Nielsen | F24H 1/106 392/466 |
| 2017/0089608 A1 | * | 3/2017 | Trembly | F24H 1/203 |

FOREIGN PATENT DOCUMENTS

| | | |
|---|---|---|
| JP | 2001-169734 A | 6/2001 |
| JP | 2009-5583 A | 1/2009 |
| JP | 2015-156349 A | 8/2015 |

* cited by examiner

*Primary Examiner* — Michael A Laflame, Jr.
(74) *Attorney, Agent, or Firm* — McCormick, Paulding & Huber PLLC

(57) ABSTRACT

A main energizing/heating unit has an outer electrode and an inner electrode, and energizes a fool material to be gelatinized by heating and continuously heat-treats it while it is conveyed in a food flow channel. The food flow channel in which the food material flows is formed between the both electrodes. Fed to the food material flowing in the food flow channel by a power supply section is a current in a direction traversing a flow direction of the food material. An inner cooling flow channel is formed in the inner electrode, and cooling liquid is fed to the inner cooling flow channel through a piping.

14 Claims, 16 Drawing Sheets

CONTINUOUS HEAT-TREATING APPARATUS FOR FOOD MATERIAL AND ENERGIZING AND HEATING METHOD

TECHNICAL FIELD OF THE INVENTION

The present invention relates to a continuous heat-treating apparatus that energizes and heats a food material(s) to be gelatinized by heating while the food material is conveyed.

BACKGROUND OF THE INVENTION

In order to energize a food material(s), heat for cooking it by Joule heat, and heat for sterilizing it while the food material having liquidity is conveyed through a flow path in a pipe, a continuous heat-treating apparatus disclosed in Patent Document 1 (Japanese Patent Application Laid-open No. 2001-169734) and a Joule heating apparatus disclosed in Patent Document 2 (Japanese Patent Application Laid-open No. 2015-156349) have been developed. A continuous heat-treating apparatus for food material includes a ring electrode type, an internal/external electrode type, and a flat plate type. Patent Document 1 discloses continuous energizing/heating apparatuses having the ring electrode and internal/external electrode types, and Patent Document 2 discloses a Joule heating apparatus having the ring electrode type. Further, Patent Document 3 (Japanese Patent Application Laid-open No. 2009-5583) discloses an AC high-electric-field sterilizing apparatus having the flat plate type.

The ring electrode type has heating pipes that are formed by a plurality of annular electrodes and a plurality of cylindrical spacers each made of an insulating material. While a food material(s) is caused to flow through each food channel in the heating pipes, the ring electrode type carries a current axially and between the annular electrodes axially adjacent to each other and energizes and heats the food material by Joule heat. In the ring electrode type, the cylindrical spacers each made of a resin form the food channel. The internal/external electrode type has a heating pipe, which is formed by a cylindrically-shaped outer electrode and a bar-shaped inner electrode placed inside the outer electrode and concentrically with the outer electrode. While a food material(s) is caused to flow in a tubular food flow channel(s) formed between the outer and inner electrodes, the internal/external electrode type carries a current radially, i.e., laterally between the outer and inner electrodes and energizes and heats the food material by Joule heat. Additionally, the flat plate type has electrode plates arranged on both surfaces of a plate-like spacer made of a resin. While a food material(s) is caused to flow in a food flow channel(s) formed by the both electrode plates and the plate-like spacer, the flat plate type carries a current between the opposite electrodes and energizes and heats the food material. Also in the flat plate type, the plate-like spacer made of a resin forms the food channel.

Thus, the apparatus, which heats the food material by Joule heat while the food material is caused to flow in the food flow channel, has the following advantage in comparison with a case of indirectly heating a food material(s) by hot water or steam. While the food material is caused to flow in the food flow channel, the food material can be heated in a short time and efficiently.

SUMMARY OF THE INVENTION

For example, custard cream among foods is produced by heating a food material in which eggs, sugar, and milk, etc. are mixed. Additionally, flour paste is produced by heating a food material in which wheat flour, cocoa, eggs, and fat are mixed. The above foods are mass-produced by heating up to cooking temperature. When the food material heated up to the cooking temperature is heated up to sterilization temperature, the food material is heated up to higher temperature than the cooking temperature.

Since the custard cream and the flour paste contain starch, the starch becomes gelatinized if heated up to a cooking temperature of about 60° C. to 100° C. Temperatures to be gelatinized are different depending on contents etc. of starch contained in the food material. If the starch is gelatinized, its viscosity becomes higher than that before the gelatinization.

For this reason, if the food material, which contains the large content of starch like custard cream etc. and is gelatinized by the heating to have high viscosity, is energized and heated by using the heating pipe in the ring electrode type, the food material is subjected to an influence of frictional resistance with a pipe wall, and a vicinity of the pipe wall on an inner peripheral surface side of the heating pipe becomes lower in flow velocity than a vicinity on its center side. Therefore, a heating time of the food materials close to the pipe wall becomes longer than that of the food material close to the center side, and the food material close to the pipe wall becomes high temperature. As a result, the food material close to the pipe wall is gelatinized first, which brings occurrence of a void phenomenon. When the void phenomenon occurs, the food material close to the pipe wall is not extruded and adheres to the pipe wall to bring occurrence of a burn, so that a spark is finally caused in the heating pipe. Since the cylindrical spacer having low thermal conductivity and made of a resin forms the food flow channel in the ring electrode type, the ring electrode type cannot cool the cylindrical spacer.

In the Joule heating apparatus disclosed in Patent Document 2, an agitation shaft is provided inside the heating pipe, and the food material is agitated by an agitating blade(s) provided on the agitation shaft. The food material is scraped from a pipe wall surface of the heating pipe by the agitating blade, and so is heated without staying in the vicinity of the pipe wall. However, the food material in vicinities of the agitating blade and the agitation shaft corotates with the agitating blade and the agitation shaft depending on a level of high viscosity of the food material, and flow velocity of the food material becomes late, so that the food material adheres to the agitating blade and the agitation shaft, which brings occurrence of a burn.

The flat plate type has a food flow channel with a narrow width and supplies a liquid food material(s) having low viscosity so as to become a turbulent flow, and so cannot be applied to the heating of the food material having high viscosity by the heating. Further, the food material cannot be cooled by using, as a cooling structure, the plate-like spacer made of a resin.

Meanwhile, in the Joule heating apparatus of the internal/external electrode type having the cylindrically-shaped outer electrode and the bar-shaped inner electrode, the current flows radially, i.e., in a direction traversing a flow direction of the food material between the inner and outer electrodes. An outer peripheral surface of the bar-shaped inner electrode has a smaller contact area to be contacted by the food material than the inner peripheral surface of the cylindrically-shaped outer electrode since the inner electrode is placed inside the outer electrode. For this reason, current density in the vicinity of the inner electrode becomes higher than in the vicinity of the outer electrode. Additionally, the flow velocity of the food material contacting with the inner and outer electrodes becomes late due to frictional resistance. As a result, the food material in the vicinity of the inner electrode easily cause the occurrence of the burn and/or spark due to influences of the current density and the flow velocity in comparison with the food material in the vicinity of the outer electrode.

As described above, since there is a possibility that the burn and/or spark of the food material will occur in the heating pipe, the food material to be gelatinized cannot be heated stably, which makes it impossible to efficiently heat for cooking and/or sterilizing the food material.

An object of the present invention is to provide a continuous heat-treating apparatus that can stably and efficiently heat a food material(s) to be gelatinized by heating.

A continuous heat-treating apparatus for food material according to the present invention heats a liquid food material to be gelatinized by the heating, and the apparatus includes a main energizing/heating unit, in which the main energizing/heating unit includes: a cylindrically-shaped outer electrode; a bar-shaped inner electrode placed inside the outer electrode, a food flow channel in which the food material flows being formed between the outer and inner electrodes; a power supply section feeding power to the outer and inner electrodes, and energizing the food material, which flows in the food flow channel, in a direction traversing a flow direction of the food material; and a piping feeding cooling liquid to an inner cooling flow channel, the inner cooling flow channel being formed in the inner electrode, and in which the food material is heated while the inner electrode is cooled.

An energizing and heating method for food material according to the present invention heats a food material to be gelatinized by the heating while the food material is conveyed in a food flow channel formed between a cylindrically-shaped outer electrode and a bar-shaped inner electrode placed in the outer electrode, and the method includes: feeding power to the outer and inner electrodes to energize, in a direction traversing a flow direction of the food material, the food material flowing in the food flow channel; feeding cooling liquid to an inner cooling flow channel formed in the inner electrode; and cooling the food material close to the inner electrode up to temperature lower than that of the food material close to a center of the food flow channel.

The main energizing/heating unit has a cylindrically-shaped outer electrode and an inner electrode placed inside the outer electrode, and is an internal/external electrode type in which a food flow channel is formed between the outer and inner electrodes. An inner peripheral surface of the outer electrode and an outer peripheral surface of the inner electrode oppose each other, an energizing area of the inner electrode is smaller in size than an energizing area of the outer electrode, and a region on an inner electrode side out of a food material becomes higher in current density than a region on an outer electrode side. As the current density becomes higher, temperature at which the food material is heated becomes higher in a high current-density region than a low current-density region. By forming an inner cooling flow channel in the inner electrode and feeding cooling liquid into the channel, however, the food material flowing near the inner electrode is cooled at lower temperature than the food material close to a center of the food flow channel. That is, the food material is heated by energizing the food material flowing in the food flow channel, and simultaneously the food material close to the inner electrode is cooled. For this reason, the food material close to a center of a cross section of the food flow channel first reaches temperature finishing being gelatinized, and the inner electrode is covered with the non-gelatinized food material. The non-gelatinized food material becomes low in frictional resistance to the inner electrode, which makes it possible to convey, at predetermined velocity, the food material gelatinized at a center portion and to heat the food material stably and efficiently.

BRIEF DESCRIPTIONS OF THE DRAWINGS

Figure 1:
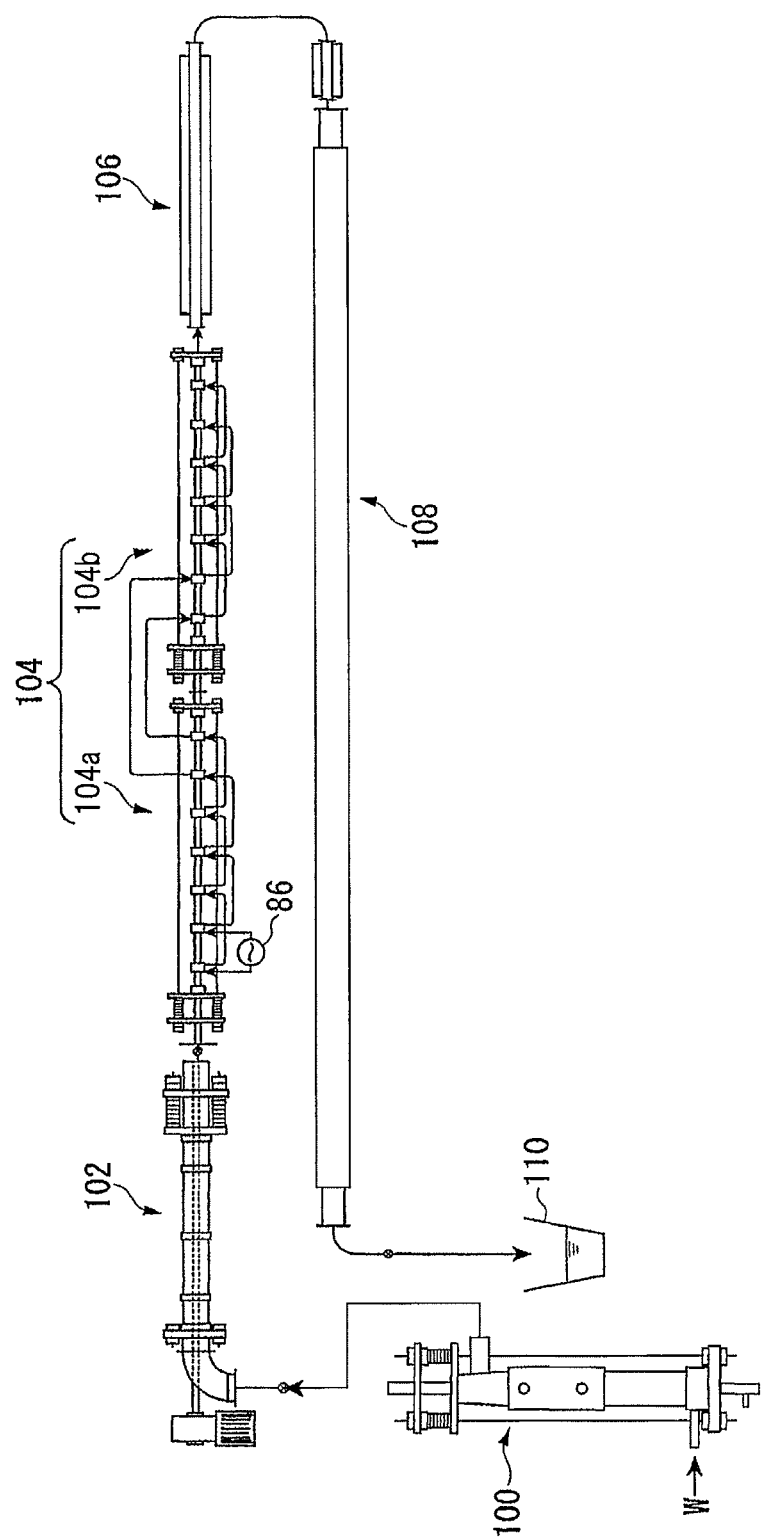
FIG. 1 is a schematic view an entire configuration of a continuous heat-treating apparatus for food material, which is one embodiment.
Figure 7:
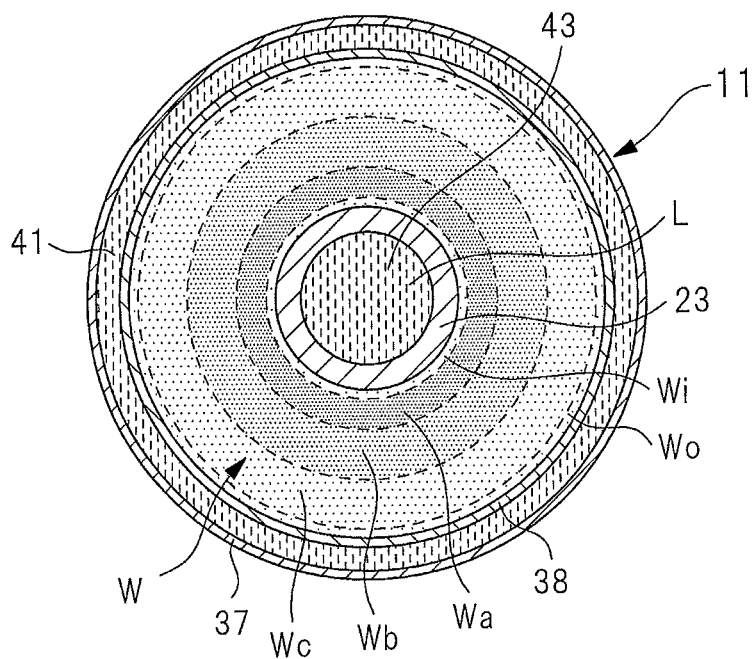
FIG. 7 is a transverse sectional view of FIG. 6.
Figure 8:
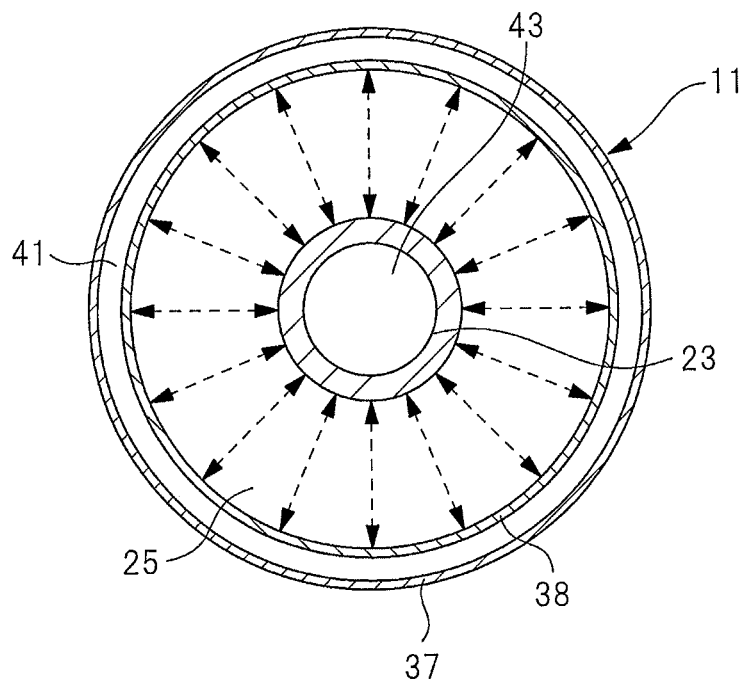
Figure 9:
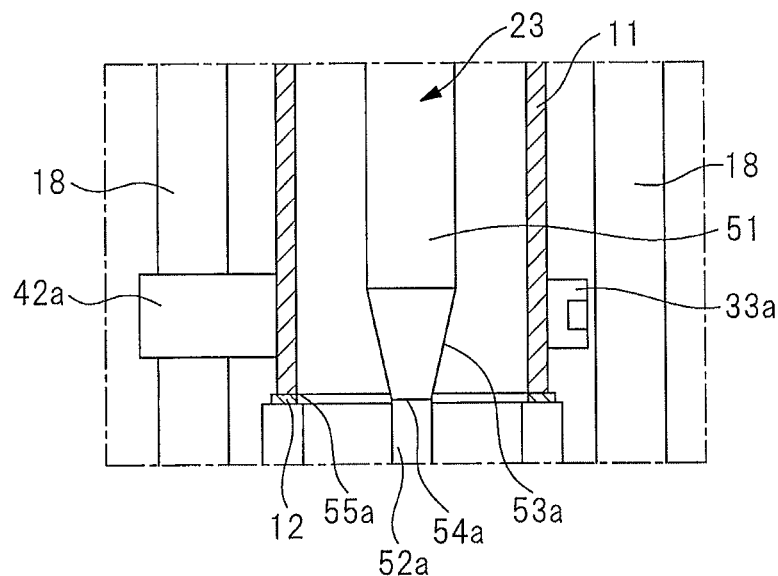
Figure 10:
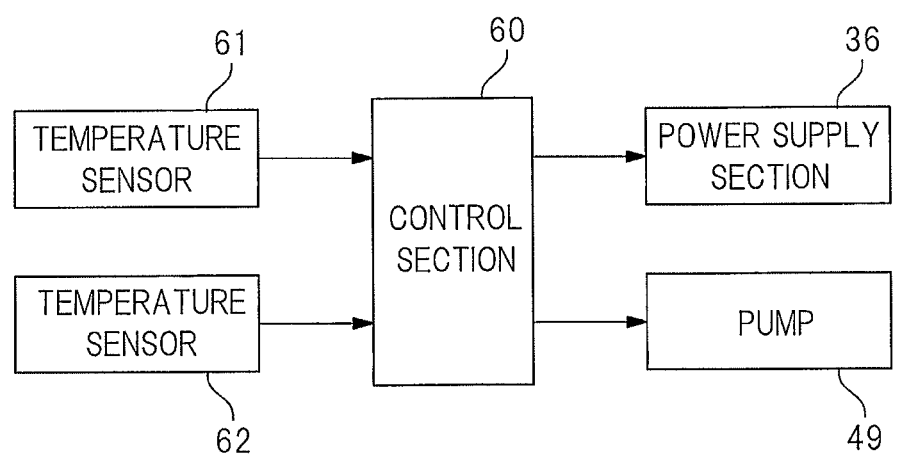
Figure 11:
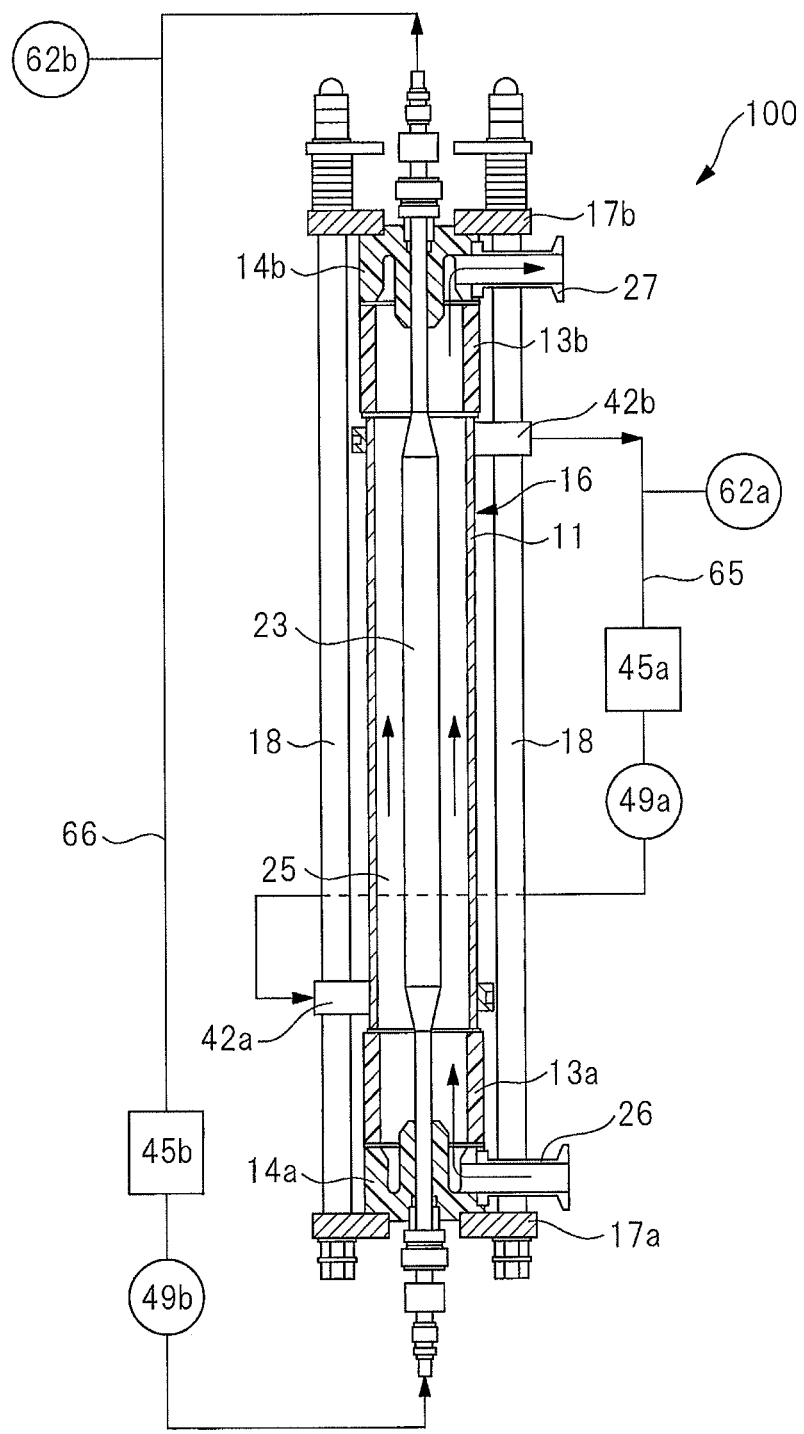
Figure 12:
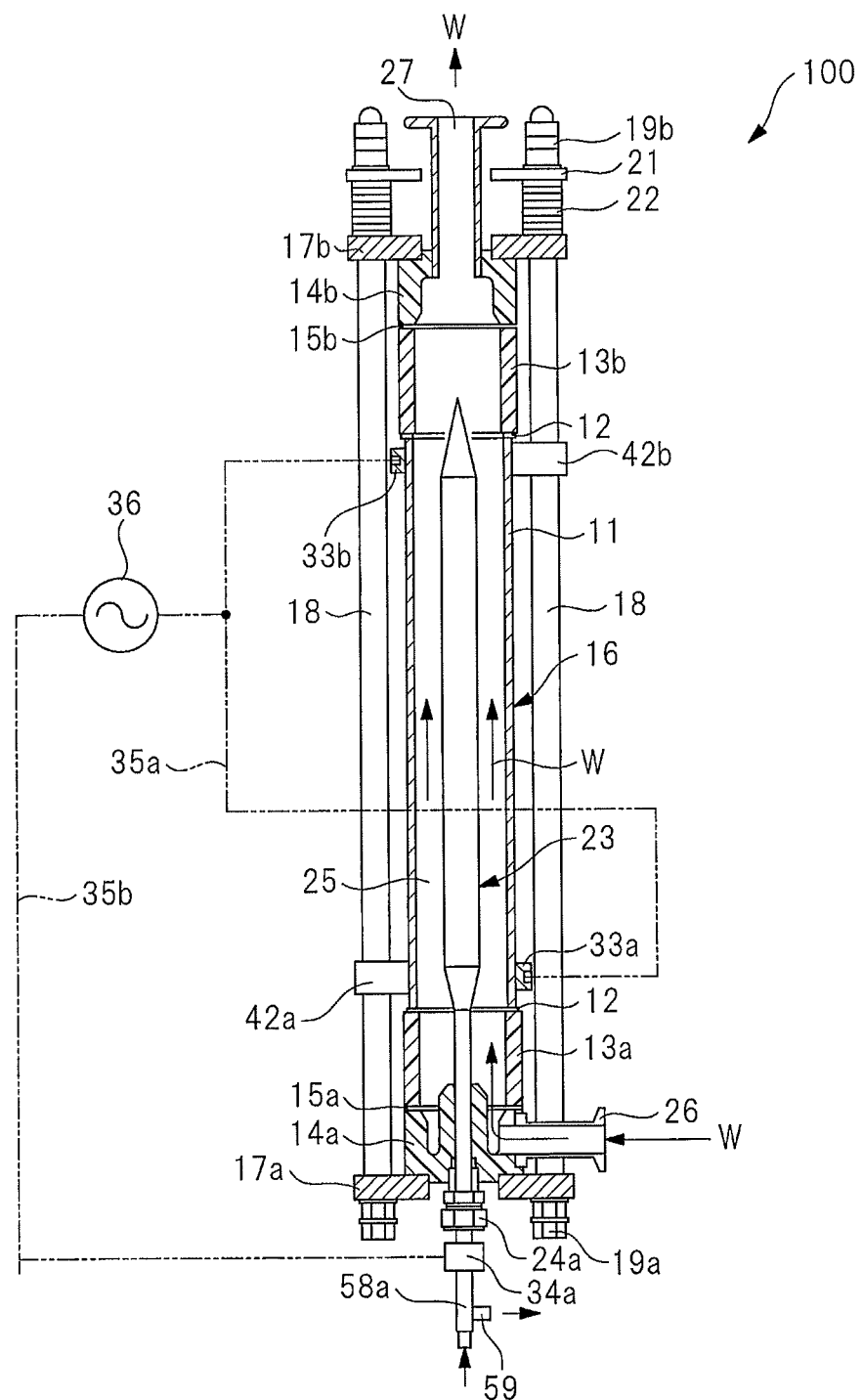
Figure 13:
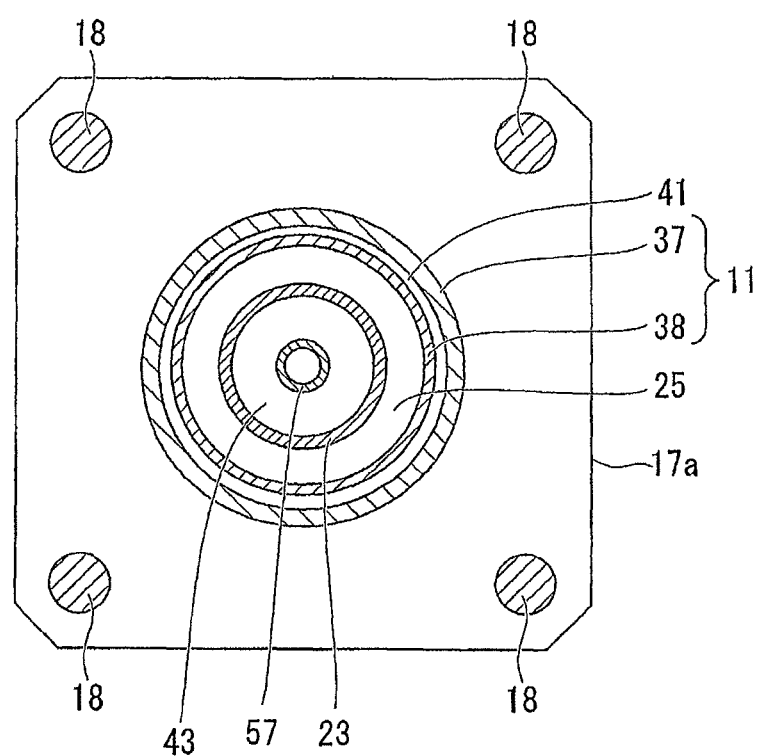
Figure 14:
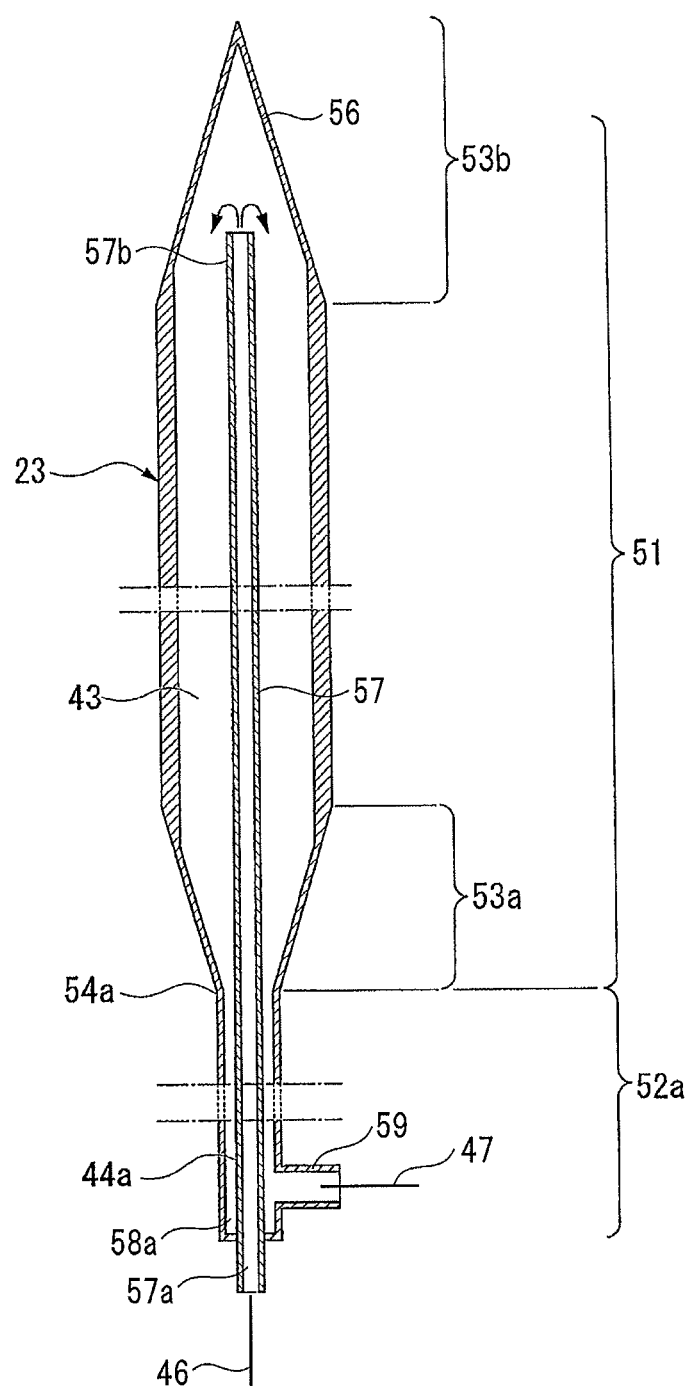
Figure 15:
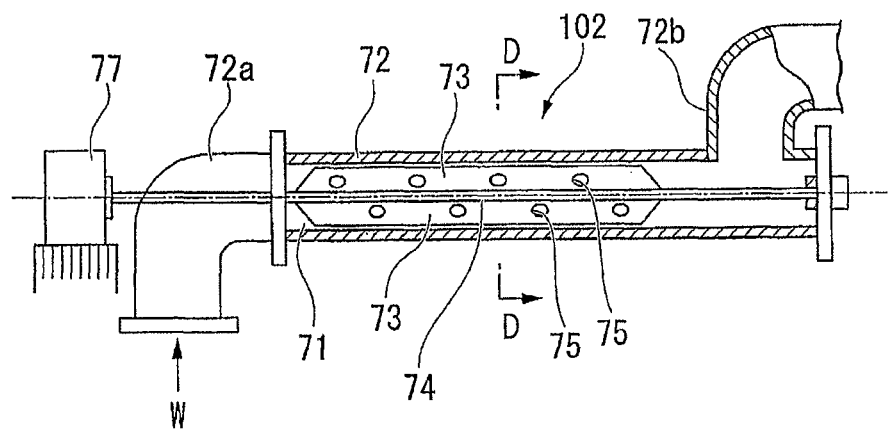
Figure 16:
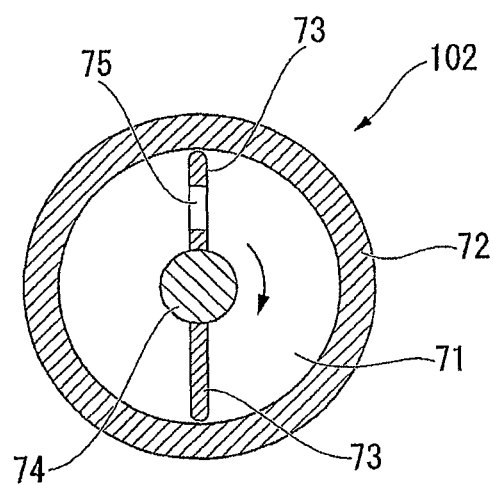
Figure 17:
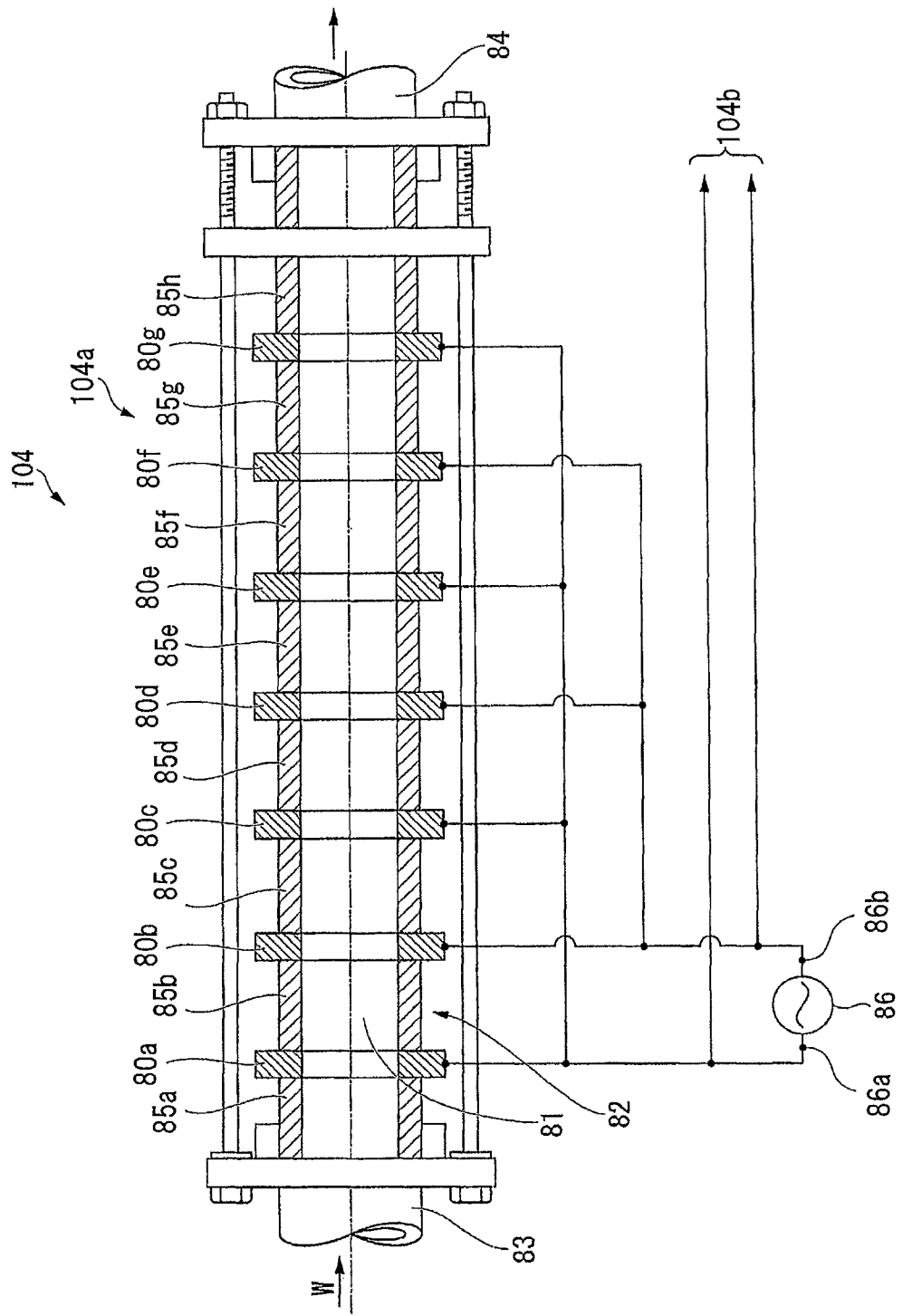
Figure 18:
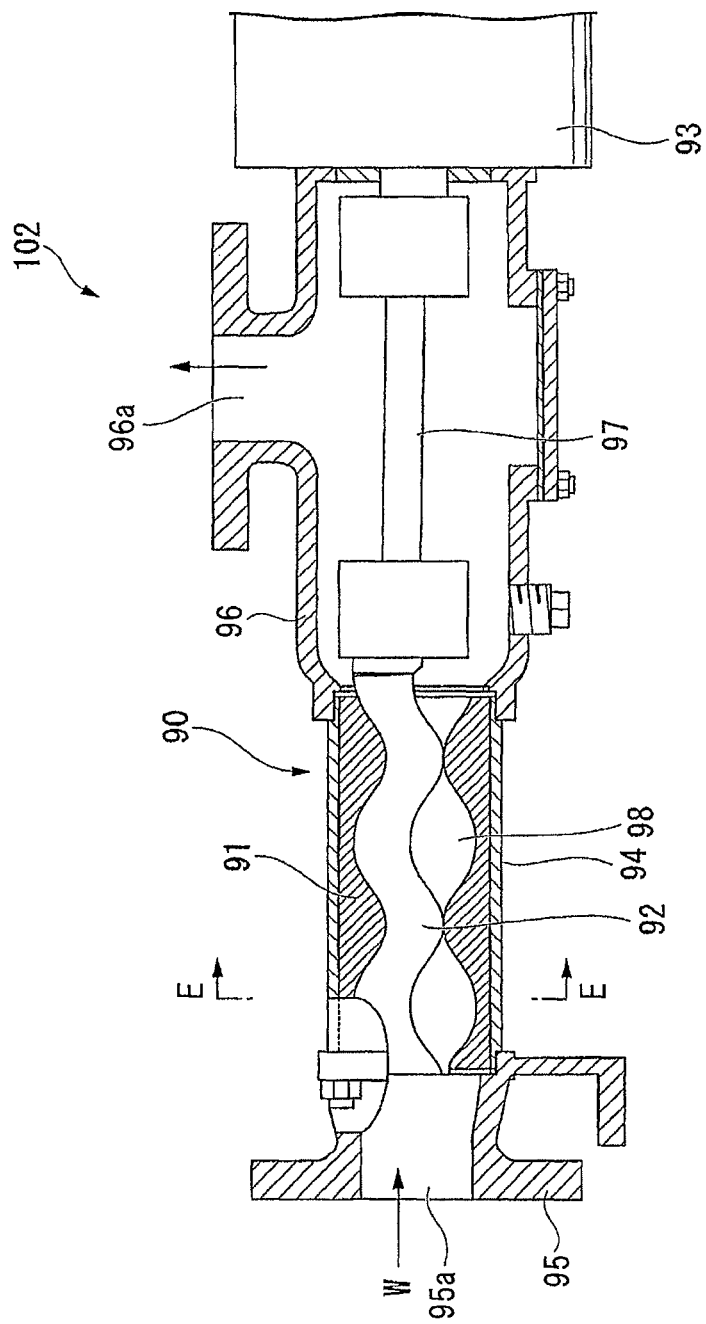
Figure 19:
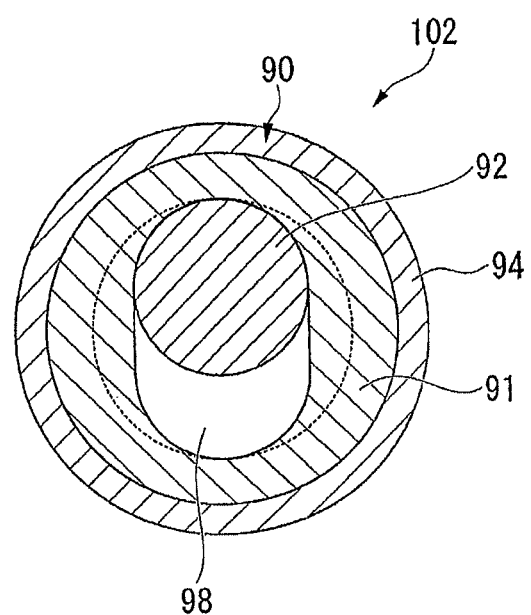

FIG. 8 conceptually shows current density in the food material between the inner and outer electrodes, and is a transverse sectional view illustrating the same as that in FIG. 7;

FIG. 9 is an enlarged sectional view illustrating an inlet portion of a food flow channel out of the inner and outer electrodes;

FIG. 10 is a block diagram illustrating a control circuit of an energizing/heating unit;

FIG. 11 is a longitudinal sectional view illustrating an energizing/heating unit that is a modification example;

FIG. 12 is a longitudinal sectional view illustrating an energizing/heating unit that is another modification example;

FIG. 13 is an enlarged sectional view taken along line C-C in FIG. 12;

FIG. 14 is an enlarged, partially-omitted sectional view of an inner electrode shown in FIG. 12;

FIG. 15 is a longitudinal sectional view of an agitating unit shown in FIG. 1;

FIG. 16 is a sectional view taken along line D-D in FIG. 15;

FIG. 17 is a schematically sectional view illustrating one energizing unit constituting a sub energizing/heating unit;

FIG. 18 is a schematically sectional view illustrating an agitating unit that is a modification example; and FIG. 19 is a sectional view taken along line E-E in FIG. 18.

DESCRIPTIONS OF THE PREFERRED EMBODIMENTS

Hereinafter, an embodiment according to the present invention will be detailed base on the accompanying drawings. As shown in FIG. 1, a continuous heat-treating apparatus for food material has a main energizing/heating unit 100 and an agitating unit 102. The main energizing/heating unit 100 is a unit for energizing a food material(s), which contains starch line flour paste etc. and is to be gelatinized by heating, and for heating it from normal temperature to cooking temperature. The agitating unit 102 forcibly agitates the food material heated by the main energizing/heating unit 100 while the food material is conveyed in a flow channel. The agitated food material is fed into a sub energizing/ heating unit 104, and is continuously energized and heated up to sterilizable temperature. The main energizing/heating unit 100 is an internal/external electrode type; the sub energizing/heating unit 104 is a ring-like electrode type; and the food material is heated by Joule heat. The food material discharged from the sub energizing/heating unit 104 is kept by a holding unit 106 in a predetermined time, and a sterilization processing to the food material progresses. The food material discharged from the holding unit 106 is cooled by a cooling unit 108, and is recovered into, for example, a collecting container 110 as a collecting portion.

As shown in FIG. 1, the main energizing/heating unit 100 and the cooling unit 108 are linked through a continuous flow channel. The sub energizing/heating unit 104 is constituted by two energizing/heating units 104*a* and 104*b* connected in series, but the sub energizing/heating unit 104 may be constituted by a single energizing/heating unit.

In the continuous heat-treating apparatus shown in FIG. 1, the liquid food material such as custard cream or flour paste is first energized and heated continuously by the main energizing/heating unit 100 with an interior/exterior electrode type up to a gelatinization temperature region of about 70° C. to 100° C., which brings progress of gelatinization. Here, the main energizing/heating unit 100 having the interior/exterior electrode type can cause the gelatinization to progress effectively, but the food material discharged from the main energizing/heating unit 100 has great variations in temperature and/or variations in viscosity. The food material introduced into the agitating unit 102 in a state of having such great variations of them is forcibly agitated, and its temperature and viscosity are made uniform. Such a food material is fed into the sub energizing/heating unit 104 with a ring-like electrode type, and is energized and heated up to a sterilization temperature of about 100° C. to 140° C. The food material heated in a range of about 100° C. to 140° C. is fed into the holding unit 106, and is kept in its temperature region, and its sterilization processing progresses. Thereafter, the food material is cooled by the cooling unit 108 up to a temperature of, for example, about 40° C., and is recovered into the collecting container 110.

A front stage of the main energizing/heating unit 100 may be provided with a not-shown preheating unit for preheating the food material before a food material W flows into the main energizing/heating unit 100. In this case, it is preferable that a flow channel of the preheating unit is also made a continuous flow channel from the main energizing/heating unit 100 to the cooling unit 108. Preheating temperature is not limited particularly, but it is preferably that the present invention has a constitution capable of being preheated up to a temperature region of about 40° C. to 60° C. Used as the preheating unit is, for example, a heat exchanger of a plane type, a double tube type, or the like for heating the food material by a temperature medium such as hot water or steam.

The food material to be fed to the main energizing/heating unit 100 reaches, in some cases, a temperature of, for example, about 50° C. to 55° C. by mixing and/or kneading a plurality of materials, and such a food material can be also fed to the main energizing/heating unit 100 in a kneaded state without being preheated.

Figure 2:
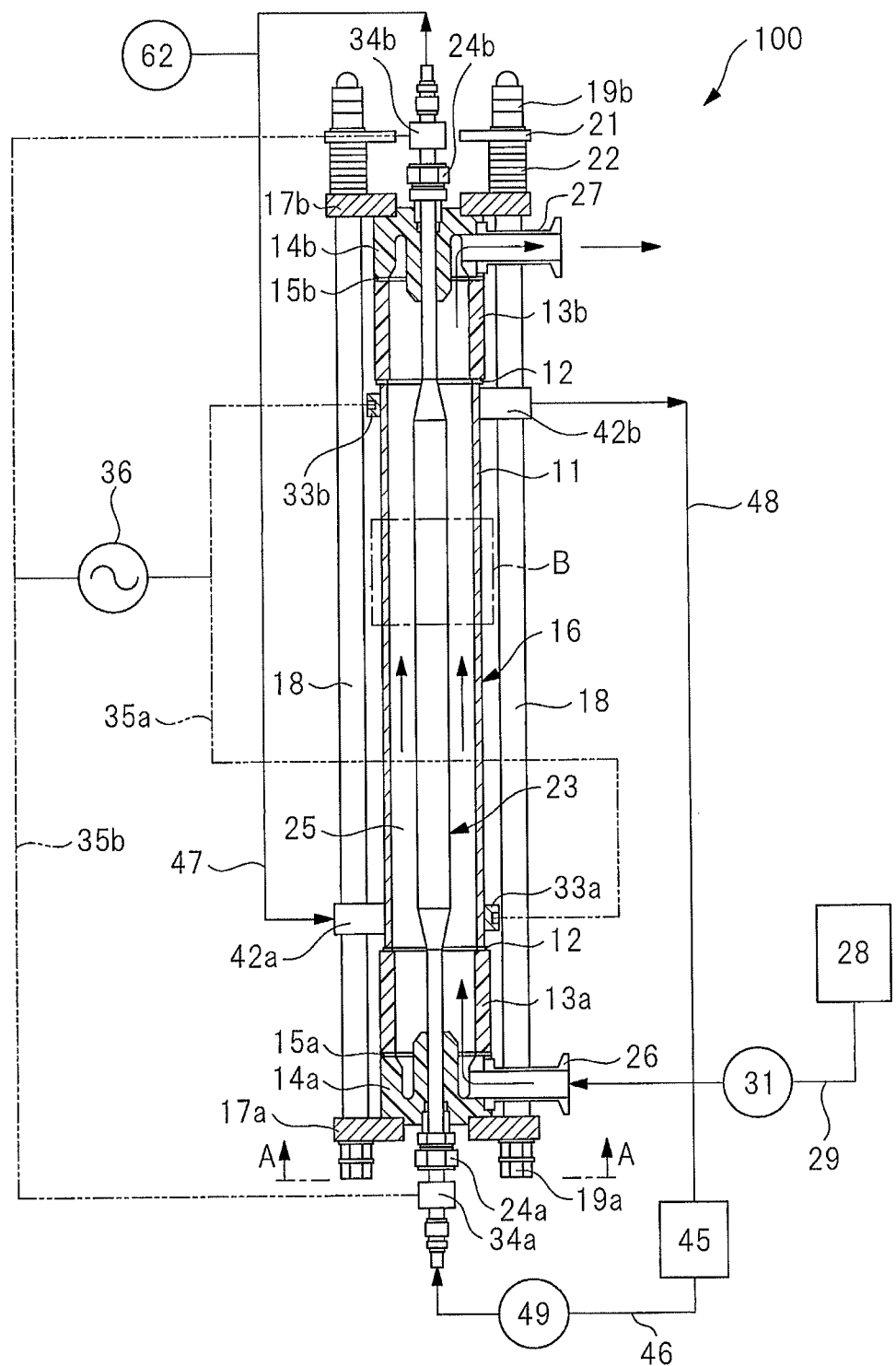
FIG. 2 is a longitudinal sectional view illustrating a main energizing/heating unit shown in FIG. 1.

As shown in FIG. 2, the main energizing/heating unit 100 has a cylindrically-shaped outer electrode 11. The outer electrode 11 is formed of a conductive material such as titanium, and is placed so that its central axis becomes a vertical direction. Spacers 13*a* and 13*b* each made of an insulating material such as a resin abut on both end surfaces of the outer electrode 11 via seal packings 12. An inlet-side lid member 14*a* made of an insulating material abuts on the spacer 13*a* via a seal packing 15*a*. An outlet-side lid member 14*b* made of an insulating material abuts on the spacer 13*b* via a seal packing 15*b*. A heating pipe 16, which guides the food material, is assembled by the spacers 13*a*, 13*b* and the lid members 14*a*, 14*b* arranged on both end sides of the cylindrically-shaped outer electrode 11, and both end portions of the heating pipe 16 are closed by the lid members 14*a* and 14*b*.

Figure 3:
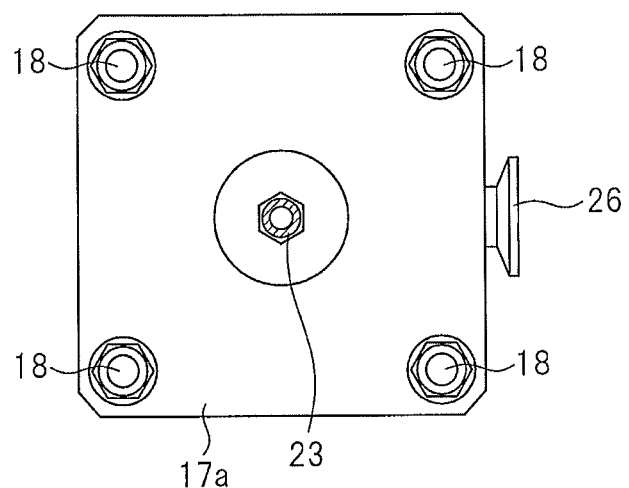
FIG. 3 is an enlarged sectional view taken along line A-A in FIG. 2.

The inlet-side lid member 14*a* is fixed to a fastening bracket 17*a*. The outlet-side lid member 14*b* is fixed to a fastening bracket 17*b*. The both fastening brackets 17*a* and 17*b* have almost the same shape. The both fastening brackets 17*a* and 17*b* are fastened by four fastening rods 18. As shown in FIG. 3, lower end portions of the fastening rods 18 penetrate through four corners of the fastening bracket 17*a*, and the fastening rods 18 penetrate through the fastening bracket 17*b*. Nuts 19*a* are screwed at a lower end portion of each fastening rod 18 shown by FIG. 2, and nuts 19*b* are screwed at an upper end portion thereof. A fastening plate 21, on which the nuts 19*b* abut, is placed at upper portions of the fastening rods 18, and spring members 22 are attached between the fastening plate 21 and the fastening bracket 17*b*. By adjusting a fastening amount of each nut 19*b*, a fastening force of the heating pipe 16 due to the spring members 22 is adjusted.

A bar-shaped inner electrode 23 is placed inside the outer electrode 11 so as to be concentric with the outer electrode 11, and the inner electrode 23 is formed of a conductive material such as titanium. The inner electrode 23 is longer than the heating pipe 16, and both end portions of the inner electrode 23 penetrate through the lid members 14*a* and 14*b* and protrude more axially outwardly than the fastening brackets 17*a* and 17*b*. Attached to the lid members 14*a* and 14*b* are not-shown seal members for sealing areas between the inner electrode 23 and each of the lid members 14*a* and 14*b*. Nuts 24*a* and 24*b* for fixing the inner electrode 23 to the fastening brackets 17*a* and 17*b* are screwed at a protrusion portion of the inner electrode 23.

Between the heating pipe 16 and the inner electrode 23, a food flow channel 25 in which the food material flows is formed, and has a pipe shape. Thus, the heating pipe 16 has the pipe-shaped food flow channel 25 that is formed with the inner electrode 23, and the food flow channel 25 is formed also between the inner electrode 23 and the outer electrode 11. The lid member 14*a* is provided with an inflow-side joint 26, and an inner flow channel of the joint 26 communicates with the food flow channel 25. The lid member 14*b* is provided with an outflow-side joint 27, and an inner flow channel of the joint 27 communicates with the food flow channel 25. Inside diameters of the inflow-side and outflow-side joints 26 and 27 are made smaller than that of the food flow channel 25, and cross-sectional areas of portions, in which the food material flows, out of the lid members 14*a* and 14*b* are smaller than a cross-sectional area of the food flow channel 25. Therefore, flow velocity of the food material, which has flowed in the food flow channel 25 via the lid member 14*a* from the inflow-side joint 26, becomes late, and flow velocity of the food material, which flows out to the outflow-side joint 27 via the lid member 14*b*, becomes fast.

A container 28 accommodating the food material is placed outside the main energizing/heating unit 100, and the container 28 is connected to the joint 26 by a feed piping 29. The feed piping 29 is provided with a pump 31, and the food material in the container 28 is continuously conveyed to and fed into the food flow channel 25 via the joint 26 by the pump 31. A discharge piping 32 is connected to the joint 27, and the food material passing through the food flow channel 25 is discharged outside the main energizing/heating unit 100 by the discharge piping 32. A flow of the food material in the food flow channel 25 is indicated by arrows illustrated in FIG. 2.

Feeding plugs 33a and 33b are attached to an inflow-side end portion and an outflow-side end portion of the outer electrode 11. Meanwhile, feeding plugs 34a and 34b are attached to an inflow-side end portion and an outflow-side end portion of the inner electrode 23. A feeding cable 35a is connected to the feeding plugs 33a and 33b of the outer electrode 11, and a feeding cable 35b is connected to the feeding plugs 34a and 34b of the inner electrode 23. Each of the feeding cables 35a and 35b is connected to a power supply section 36. Fed to each of the feeding plugs from the power supply section 36 is a high-frequency current of, for example, 20 KH. The respective two feeding plugs 33a and 33b are attached to the outer electrode 11, but only one of them may be attached thereto. Similarly, the two feeding plugs 34a and 34b are provided also to the inner electrode 23, but only one of them may be provided.

When power is fed to the outer electrode 11 and the inner electrode 23 from the power supply section 36 under a state in which the food material is fed into the food flow channel 25, a current is carried in the food material, which flows in the food flow channel 25, in a direction traversing a flow direction of the food material. For this reason, the food material is energized and heated when flowing between the outer electrode 11 and the inner electrode 23.

Figure 4:
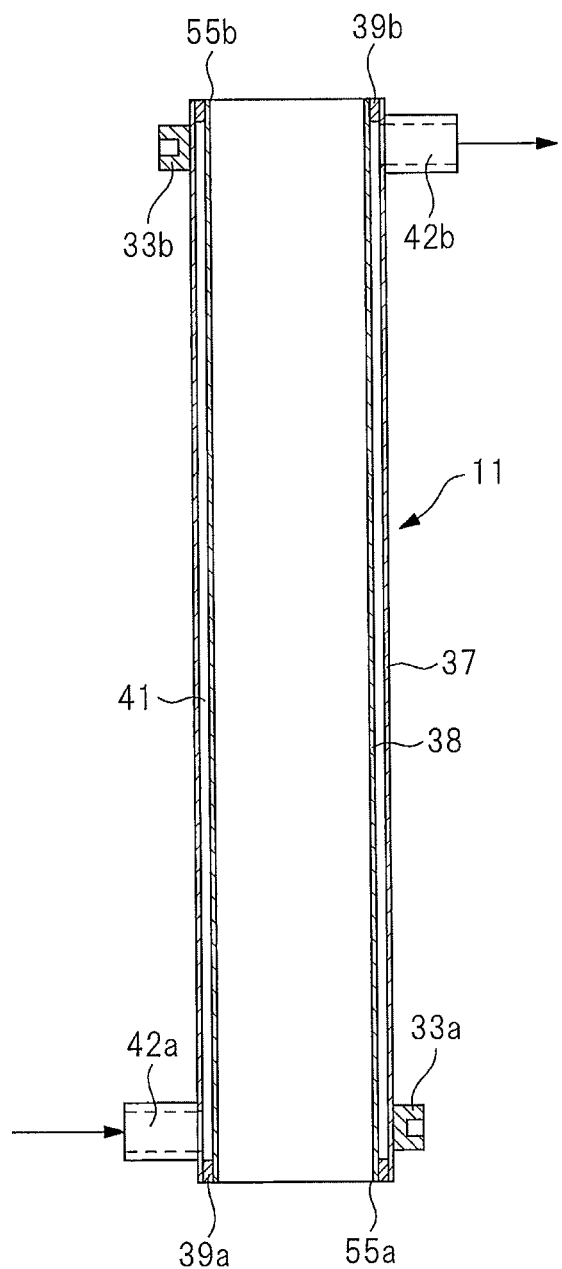
FIG. 4 is an enlarged sectional view of an outer electrode shown in FIG. 2.

As shown in FIG. 4, the outer electrode 11 has an outer tube 37, and an inner tube 38 smaller in diameter than the outer tube. Both end portions of each tube are provided with connection rings 39a and 39b, and an outer cooling flow channel 41 is formed axially inside the outer electrode 11. A lower end portion of the outer electrode 11 in FIG. 4 is provided with an inflow-side cooling-liquid joint 42a, and an inner flow channel of the cooling-liquid joint 42a communicates with an outer cooling flow channel 41. An upper end portion of the outer electrode 11 in FIG. 4 is provided with an outflow-side cooling-liquid joint 42b, and an inner flow channel of the cooling-liquid joint 42b communicates with the outer cooling flow channel 41. Therefore, the outer electrode 11 is cooled by cooling liquid that flows axially in the outer cooling flow channel 41 from the cooling-liquid joint 42a toward the cooling-liquid joint 42b.

Figure 5:
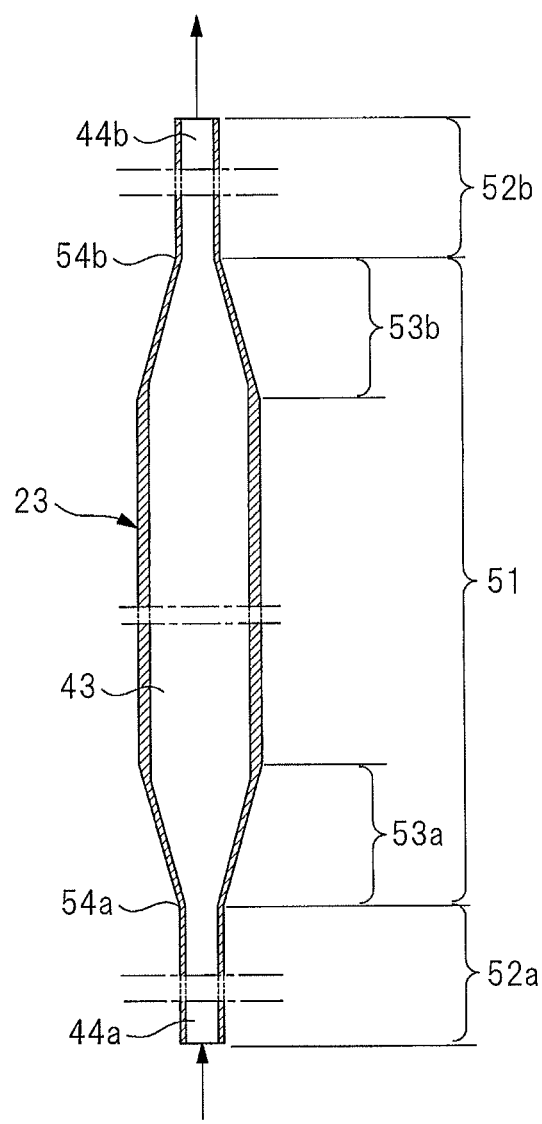
FIG. 5 is an enlarged, partially-omitted sectional view of an inner electrode shown in FIG. 2.

As shown in FIG. 5, the inner electrode 23 is formed by a hollow, stepped bar member, and an inner cooling flow channel 43 is formed inside the inner electrode 23. A lower end portion, i.e., a base end portion 44a of the inner electrode 23 in FIG. 5 is set as a cooling-liquid inflow portion, and an upper end portion, i.e., a tip end 44b is set as a cooling-liquid outflow portion. Therefore, the inner electrode 23 is cooled by cooling liquid which flows from the cooling-liquid inflow portion of the base end portion 44a toward the cooling-liquid outflow portion of the tip portion 44b.

The cooling liquid from a cooling-liquid tank 45 shown in FIG. 2 is circulated between and fed to the outer cooling flow channel 41 and the inner cooling flow channel 43. The cooling-liquid tank 45 is connected to the base end portion 44a of the inner electrode 23 by the piping 46, and the cooling liquid is fed to the inner cooling flow channel 43 from an inflow side of the food material. The tip end portion 44b is connected to the cooling-liquid flow joint 42a of the outer electrode 11 by a circulation piping 47, and the cooling liquid passing through the inner cooling flow channel 43 is fed to the outer cooling flow channel 41 from an inflow side of the food material. The cooling liquid passing through the outer cooling flow channel 41 is returned to the cooling-liquid tank 45 through a piping 48. Thus, the cooling liquid in the cooling-liquid tank 45 is circulated in the inner cooling flow channel 43 and the outer cooling flow channel 41 that are continuously formed. A not-shown heat exchanger is incorporated in the cooling-liquid tank 45, and the cooling liquid in the cooling-liquid tank 45 is kept at predetermined temperature and is fed to the main energizing/heating unit 100 by the pump 49 provided to the piping 46. However, as described above, the cooling liquid kept at the predetermined temperature is fed to the inner cooling flow channel 43 and the outer cooling flow channel 41 without circulating the cooling liquid in the cooling-liquid tank 45, and the cooling liquid discharged from the outer cooling flow channel 41 may be discarded outside.

Figure 6:
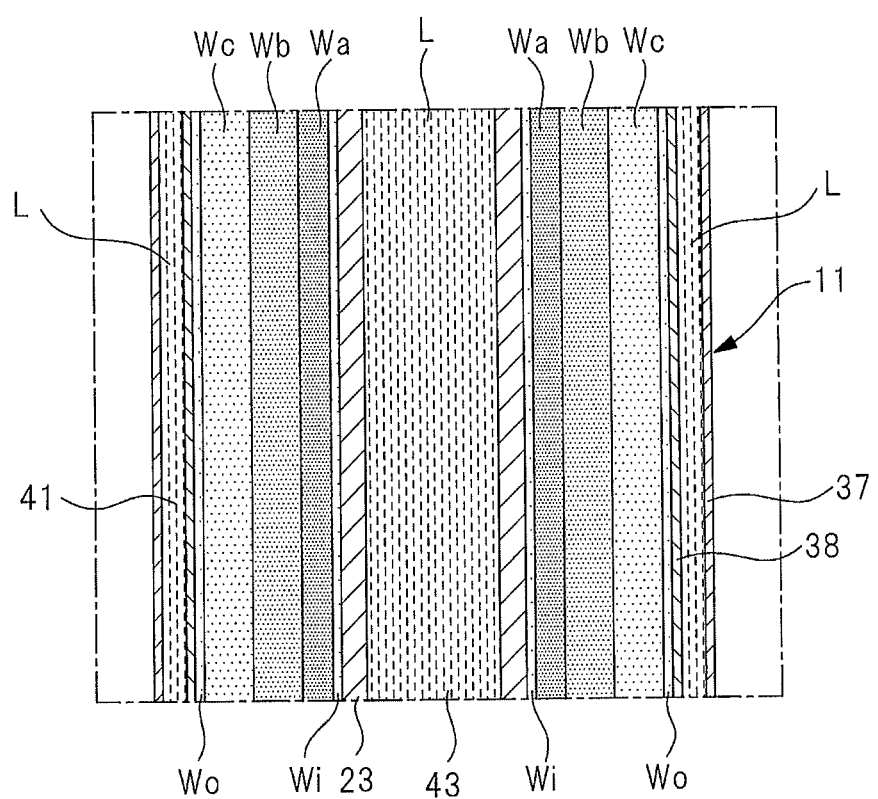
FIG. 6 is an enlarged sectional view of portion B shown in FIG. 2, and shows cooling liquid and food materials.

FIG. 2 shows a state in which the food material is not fed to the food flow channel 25 and the cooling liquid is not fed thereto either. FIG. 6 is an enlarged sectional view of portion B in FIG. 2, and FIG. 7 is a transverse sectional view of FIG. 6. In FIGS. 6 and 7, cooling liquid L and a food material W are illustrated.

Conveyed into the food flow channel 25 between the outer electrode 11 and the inner electrode 23 is the food material W accommodated in the container 28. Meanwhile, the cooling liquid L flows in the inner cooling flow channel 43 formed inside the inner electrode 23 and the outer cooling flow channel 41 formed inside the outer electrode 11.

FIG. 8 is a sectional view conceptually showing current density in the food materials W between the inner electrode 23 and the outer electrode 11, and illustrates almost the same portion as that of FIG. 7.

As shown in FIG. 2, the main energizing/heating unit 100 has a cylindrically-shaped outer electrode 11 and a bar-shaped inner electrode 23 placed inside the outer electrode 11, and is an interior/exterior electrode type. In the main energizing/heating unit 100 having such a type, an energizing area of an outer periphery of the inner electrode 23 is smaller than an energizing area of an inner periphery of the outer electrode 11. For this reason, if a current is carried in the food material W, which flows in the food flow channel 25, in a direction traversing a flow direction of the food material, a current density of a portion in a range close to the inner electrode 23 out of the food material W becomes higher than that of a portion in a range close to the outer electrode 11 out of the food material W. Thus, the portion having the high current density becomes higher in heating temperature of the food material W than the portion having the low current density.

Therefore, if the food material, which has a great content of starch like custard cream etc., is gelatinized by the heating, and has high viscosity, is energized and heated by using the main energizing/heating unit 100 with an internal/external electrode type without cooling the inner electrode 23, the flow velocity of the food material in the vicinity of the inner electrode 23, i.e., on an inner peripheral surface side becomes later due to frictional resistance to the food material and the inner electrode 23 than that of the food material on a radially outer side, i.e., near a center of the food material. For this reason, the food material in the vicinity of the inner electrode 23 brings occurrence of a burn and/or spark due to influences of the current density and the flow velocity.

In contrast, as described above, when the food material near the inner electrode is cooled by causing the cooling liquid to flow in the inner cooling flow channel 43 inside the inner electrode 23, it can be cooled at lower temperature than the food material near the center of the food flow channel 25, and the food material near the center thereof can be gelatinized.

As shown in FIG. 5, the inner electrode 23 has an energizing portion 51 radially opposed to the outer electrode 11, and protruding portions 52a and 52b protruding more axially outwardly than both end surfaces of the outer electrode 11. Each of the protruding portions 52a and 52b is smaller in diameter than the energizing portion 51, and becomes a non-energizing portion. Both end portions of the energizing portion 51 are provided with taper portions 53a and 53b that gradually have small diameters toward the protruding portions 52a and 52b. Minimum diameter portions 54a and 54b of the respective taper portions 53a and 53b are brought inwardly close to an end surface of the outer electrode 11. Thus, when the minimum diameter portions 54a and 54b are positioned at the end surface of the outer electrode 11, a radial distance between the outer electrode 11 and the energizing portion 51 of the inner electrode 23 becomes longer than other portions. For this reason, distances between the minimum diameter portions 54a, 54b and end surface edges 55a, 55b of the outer electrode 11 become longer than other portions, and a value of a current flowing between the end surface edges 55a, 55b and the inner electrode 23 becomes smaller than other portions.

FIG. 9 is an enlarged sectional view showing an end portion of the outer electrode 11 on a food inflow side. Incidentally, in FIG. 9, the outer cooling flow channel 41 and the inner cooling flow channel 43 are omitted and not illustrated.

The current flowing between the inner electrode 23 and the outer electrode 11 is largely carried from a portion of the end surface edge 55a out of the outer electrode 11, and so it is considered that the current density between the vicinity of the end surface edge 55a and the inner electrode 23 becomes higher than other portions. In contrast, if the taper portion 53a of the inner electrode 23 is radially opposed to the end surface edge 55a, the density of the current flowing between the end surface edge 55a and the inner electrode 23 can be made lower than that of the other portions. Therefore, an axial current density distribution of the inner electrode 23 and the outer electrode 11 can be made wholly closer to uniformity. This applies also to an end portion of the outer electrode 11 on a food outflow side. However, an outside diameter of the inner electrode 23 may be made wholly the same in dimension.

A method of continuously energizing and heating the food material by the above-mentioned main energizing/heating unit 100 is carried out as follows. Accommodated in the container 28 is the food material that has a large content of starch like custard cream etc. and whose viscosity by the gelatinized starch becomes higher than that by the not-gelatinized starch when the food material is heated up to the cooking temperature. The food material is fed to the food flow channel 25 in the heating pipe 16 by the pump 31, and power fed to the inner electrode 23 and the outer electrode 11 from the power supply section 36 radially flows in the food material. The food material is energized and heated between the inner electrode 23 and the outer electrode 11 while flowing from an inflow port of the food flow channel 25 toward an outflow port thereof.

As shown in FIG. 8, if the power is fed to the electrode(s), current density of a portion in an inner region close to the inner electrode 23 out of the food material W, i.e., a portion on an inner peripheral surface side of the food flow channel 25 out of the foo material W becomes higher than that in an outer region close to the outer electrode 11, i.e., in an outer peripheral surface side of the food flow channel 25 out of the food material W. As shown in FIGS. 6 and 7, however, since the inner electrode 11 and the outer electrode 25 are cooled by the cooling liquid L, a food material Wi on the inner peripheral surface side and a food material Wo on the outer peripheral surface side are kept at lower temperature than food materials Wa to Wc close to a center therebetween, i.e., in a center region. A radially inward portion out of the food material close to the center becomes the highest temperature, and temperature of the food material close to the center gradually becomes low toward a radially outward portion thereof. As shown in FIGS. 6 and 7, if a region near a center is appropriately divided by three regions indicated as Wa to Wc, heating temperature in these regions become low from a radially inward portion Wa toward a radially outward portion Wc.

Therefore, in the food material flowing in the food flow channel 25, the food materials Wa to Wc near the center are first gelatinized under a state in which the food material Wi and the food material Wo are not gelatinized. For this reason, an outer peripheral surface of the inner electrode 23 and an inner peripheral surface of the outer electrode 11 become covered with the not-gelatinized food materials Wi and Wo, and the food materials Wa to Wc flow in the food flow channel 25. Thus, the food material W does not adhere to the electrodes, brings no occurrence of a burn and/or spark, and can be heated stably.

As shown in FIG. 1, the gelatinized food material is discharged from the outflow-side joint 27 to the agitating unit 102. The agitated food material is fed to the sub energizing/heating unit 104 from the agitating unit 102 having a pumping function, is heated up to sterilization temperature, and thereafter is kept in the holding unit 106 in a predetermined time at after-cooking sterilization temperature.

As described above, a form of heating the food material W includes: a form of heating it up to cooking temperature and then heating it up to sterilization temperature further higher than the cooking temperature; and a form of heating it up to cooking temperature for gelatinizing it. The food material, which is not heated up to the sterilization temperature after being heated up to the cooking temperature, is fed to the collection container 110 from the agitating unit 102.

FIG. 10 is a block diagram showing a control circuit of the main energizing/heating unit 100. Transmitted to a control section 60 are detection signals of a temperature sensor 61 for detecting temperature of the food material discharged from the agitating unit 102 and a temperature sensor 62 for detecting temperature of the cooling liquid L. An output voltage of the power supply section 36 is adjusted based on the detection signal of the temperature sensor 61. Additionally, a discharge amount of pump 49 is adjusted based on the detection signals of the temperature sensor 62.

FIG. 11 is a longitudinal sectional view illustrating the main energizing/heating unit 100 that is a modification example. In this main energizing/heating unit 100, a piping 65 for feeding the cooling liquid to the outer cooling flow channel 41 and a piping 66 for feeding the cooling liquid to the inner cooling flow channel 43 have different systems. As shown FIG. 11, the cooling liquid in a cooling-liquid tank 45a is fed to the outer cooling flow channel 41 by a pump 49a provide to the piping 65. Meanwhile, the cooling liquid in a cooling-liquid tank 45b is fed to the inner cooling flow channel 43 by a pump 49b provided to the piping 66. Thus, since the pipings for feeding the cooling liquid are made different systems, temperatures of the outer electrode 11 and the inner electrode 11 can be adjusted separately. A discharge amount of each of the pumps 49*a* and 49*b* is controlled by the control section 60 based on the detection signals from the temperature sensors 62*a* and 62*b* for detecting the temperature of the cooling liquid.

Each of the main energizing/heating units 100 as describe above has a form in which the cooling flow channels are formed in both of the outer electrode 11 and the inner electrode 23, but can also have such a form that, depending on a kind of food material, only the inner electrode 23 is provided with the cooling flow channel and the outer electrode 11 is provide with no cooling flow channel. Incidentally, FIG. 11 omits the container 28 and the power supply section 36, etc. shown in FIG. 2.

As shown in FIG. 11, a cooling system of the main energizing/heating unit 100 includes: a form of feeding the cooling liquid to the inner cooling flow channel 43 and the outer cooling flow channel 41 by the different-system pipings; a form of feeding the cooling liquid thereto by a continuous one-system piping as shown by FIG. 2; and a form of feeding the cooling liquid only to the inner cooling flow channel 43. As described above, a temperature controlling system of the food material includes: a form of adjusting the output voltage of the power supply section 36; a form of adjusting the flow velocity, i.e., a flow rate of the cooling liquid; and a form of adjusting both of them. Each of the forms can be appropriately selected depending on the kind of food material.

FIG. 12 is a longitudinal sectional view illustrating an energizing/heating unit that is another modification example. FIG. 13 is an enlarged sectional view taken along line C-C in FIG. 12. FIG. 14 is an enlarged, partially-omitted sectional view of an inner electrode illustrated in FIG. 12.

In this main energizing/heating unit 100, the outflow-side joint 27 is attached to the lid member 14*b* so as to be concentric with the outer electrode 11. Therefore, the food material flowing out from the inflow-side joint 26 while heated in the food flow channel 25 is discharged from the joint 27 to the agitating unit 102 without changing a flow direction of a portion on a lid member 14*b* side out of the food material.

As shown in FIG. 14, the taper portion 53*b* of the inner electrode 23 becomes a blocking portion 56, and an upper end portion of the inner electrode 23 is closed. A cooling-liquid guiding pipe 57 is provided inside the inner electrode 23, and the cooling-liquid guiding pipe 57 becomes concentric with the inner electrode 23. A base end portion 58*a* of the cooling-liquid guiding pipe 57 is fixed to a base end portion 44*a* of the inner electrode 23, and the base end portion 58*a* is connected to the piping 46. Similarly to a case shown by FIG. 2, the piping 46 is connected to the cooling-liquid tank 45, and the cooling liquid in the cooling-liquid tank 45 is guided from the base end portion 57*a* of the cooling-liquid guiding pipe 57 toward a tip portion.

A tip portion 57*b* of the cooling-liquid guiding pipe 57 is positioned inside the taper portion 53*b* of the inner electrode 23, and the tip portion 57*b* is opened in the inner cooling flow channel 43. Therefore, the cooling liquid in the cooling-liquid tank 45 is fed to the inner cooling flow channel 43 from the cooling-liquid guiding pipe 57, and flows toward the base end portion 44*a* of the inner electrode 23. The base end portion 44*a* is provided with an outflow port 59.

FIG. 15 is a longitudinal sectional view of the agitating unit illustrated in FIG. 1. FIG. 16 is a sectional view taken along line D-D in FIG. 15.

The agitating unit 102 continuously and forcibly agitates the food material in the flow channel by an agitating driving force applied from outside, the food material being heated by the main energizing/heating unit 100 in the vicinity of a gelatinization temperature region of about 70° C. to 100° C. In the agitating unit 102, a driving shaft 74 is rotatably attached into a hollow tube 72 that forms a flow channel 71 of the food material, and the driving shaft 74 is rotated and driven by an exterior power motor 77 as a driving source. Plate-like agitating blades 73 are fixed onto the driving shaft 74, and a plurality of through holes 75 penetrating in a thickness direction are formed in the agitating blades 73.

A joint member 72*a* is attached to one end of the hollow tube 72, and the food material discharged from the outflow-side joint 27 of the main energizing/heating unit 100 flows in the joint member 72*a*. The other end of the hollow tube 72 is provided with a discharging portion 72*b* that discharges the agitated food material. This discharging portion 72*b* is introduced on an inflow side of the energizing/heating unit 104*a* in the sub energizing/heating unit 104.

The food material heated in the vicinity of the gelatinization temperature region by the main energizing/heating unit 100 flows in the flow channel 71 within the hollow tube 72, and is forcibly agitated by rotation of the agitating blades 73 while flowing therein. For this reason, the temperature of the food material is uniformed, and the viscosity thereof is also uniformed.

FIG. 17 is a schematically sectional view illustrating one energizing/heating unit 104*a* constituting the sub energizing/heating unit. The energizing/heating unit 104*a* is formed by a cylindrically-shaped hollow tube 82 that is provided with a food flow channel 81. One end of the hollow tube 82 is provided with an inlet member 83, and the other end thereof is provided with an outlet member 84. The hollow tube 82 has seven ring-like electrodes 80*a* to 80*g*, and spacers 85*a* to 85*h* arranged between the two ring-like electrodes axially adjacent to each other and each made of an insulating material. One output terminal 86*a* of the power supply section 86 is connected to the ring-like electrodes 80*a*, 80*c*, 80*e*, and 80*g*, and the other output terminal 86*b* thereof is connected to the ring-like electrodes 80*b*, 80*d*, and 80*f*. A high-frequency AC waveform is applied to each of the ring-like electrodes from the power supply section 86, and the current flows in the food material along the flow direction of the food material in the food flow channel 81.

FIG. 17 shows the energizing/heating unit 104*a* in FIG. 1, and an energizing/heating unit 104*b* is almost the same ring-like electrode type, too. The number of ring-like electrodes is not limited to seven, and a plurality of ring-like electrodes may be used. The ring-like electrodes 80*a* and 80*g* at both ends of the hollow tube 82 preferably have the same phase electrically. Considering such a point, the number of ring-like electrodes is preferably three or more odd number.

As shown in FIG. 1, the sub energizing/heating unit 104 is constituted by the two energizing/heating units 104*a* and 104*b* to be connected in series. However, the sub energizing/heating unit 104 may be constituted only by one energizing/heating unit depending on a temperature condition(s), and may be constituted by two of more energizing/heating units.

As shown in FIG. 1, the food material discharged from the energizing/heating unit 104*b* is introduced into the holding unit 106. The holding unit 106 keeps the temperature of the food material heated up to a temperature region capable of sterilizing the food material by the sub energizing/heating unit 104, which brings adequate progress of a sterilization processing. The holding unit 106 is constituted, as an example, by a hollow tube in which the food material flows continuously, and an adiabatic material covering its outer periphery.

The food material discharged from the holding unit 106 is introduced into the cooling unit 108. The holding unit 106 is constituted by, for example, a double tube having an inner flow channel and an outer flow channel, and the food material is cooled by causing the cooling liquid to flow in one flow channel thereof and causing the food material to flow in the other flow channel. The cooling unit may be a heat exchanger of a plate type.

As described above, the food material heated up to the gelatinization temperature region by the main energizing/heating unit 100 has variations in temperature and/or variations in viscosity depending on a position in the flow channel. Since the food material is forcibly agitated by the agitating unit 102, their variations are eliminated, and the food material is introduced into the sub energizing/heating unit 104. Thus, since the sub energizing/heating unit 104 can uniformly heat the food material, it is not that the food material is excessively heated, thereby being burned and adhering to the ring-like electrode and/or that the spark occurs. Further, quality of the food material is prevented from being changed and/or deteriorating by excessively heating the food material. In the sub energizing/heating unit 104, lack of the heating is prevented from occurring locally, and the sterilization processing is certainly achieved.

FIG. 18 is a schematically sectional view illustrating an agitating unit that is a modification example, and FIG. 19 is a sectional view taken along line E-E in FIG. 18.

This agitating unit 102 is constituted by a rotary positive displacement pump 90 having a uniaxial eccentric screw. This pump 90 is simply called a uniaxial eccentric screw pump, one axial screw, a snake pump, or the like. FIGS. 18 and 19 illustrate a Heishin PC Pump made at HEISHIN Ltd.

This pump 90 includes: a stator 91 corresponding to a female screw; a rotor 92 corresponding to a male screw; and an electric motor 93 for eccentrically rotating the rotor 92. A joint portion 95 having an inflow port 95a is attached to one end portion of a cylindrical main casing 94, and a casing 96 in which an outflow port 96a is formed is attached to the other end portion thereof. The stator 91 is formed into a female-screw shape by an elastically deformable material such as rubber, and is fitted in the main casing 94. The rotor 92 is formed into a male-screw shape by a high rigidity material such as metal or a hard resin, and is inserted in the stator 91. The rotor 92 is linked to a shaft of the electric motor 93 via a coupling rod 97, and is eccentrically rotated.

In the screw pump 90, an accommodating space 98 in which the food material flows from the inflow port 95a advances with rotation of the rotor 92, and the food material in the accommodating space 98 is forcibly transferred to an outflow port 96a. At this time, a driving force in a transferring direction is applied to the food material, and simultaneously the food material is agitated. Therefore, the screw pump 90 can transfer custard cream and/or flour paste gelatinized and having high viscosity while agitating it.

The present invention is not limited to the above embodiments, and can be variously modified and altered within a range not departing from the gist thereof. The continuous heat-treating apparatus can be applied also to a food(s) whose viscosity is unchanged by temperature, and is effectively applied to the energization/heating of food materials, which are to be gelatinized by the heating, such as custard cream, flour paste, and further pizza sauce.

What is claimed is:

1. A continuous heat-treating apparatus for food material, the apparatus heating a liquid food material to be gelatinized by the heating, the apparatus comprising:
    a main energizing/heating unit,
    wherein the main energizing/heating unit includes:
        a cylindrically-shaped outer electrode;
        a bar-shaped inner electrode placed inside the outer electrode, a food flow channel in which the food material flows being formed between the outer and inner electrodes;
        a power supply section feeding power to the outer and inner electrodes, and energizing the food material, which flows in the food flow channel, in a direction traversing a flow direction of the food material; and
        a piping feeding cooling liquid to an inner cooling flow channel, the inner cooling flow channel being formed in the inner electrode, and
    the food material is heated while the inner electrode is cooled.

2. The continuous heat-treating apparatus for food material according to claim 1,
    wherein a tip portion of the inner electrode is provided with a blocking portion,
    a cooling-liquid guiding pipe connected to the piping is provided in the inner electrode, and
    the inner cooling flow channel is formed by the cooling-liquid guiding pipe and the inner electrode.

3. The continuous heat-treating apparatus for food material according to claim 1, further comprising a piping, the piping feeding the cooling liquid to an outer cooling flow channel, the outer cooling flow channel being formed in the outer electrode.

4. The continuous heat-treating apparatus for food material according to claim 3, further comprising a circulation piping, the circulation piping feeding, to the outer cooling flow channel, the cooling liquid discharged from the inner cooling flow channel,
    wherein the circulation piping makes the inner and outer cooling flow channels a flow channel continuous with each other.

5. The continuous heat-treating apparatus for food material according to claim 1,
    wherein the inner electrode has an energizing portion radially opposing the outer electrode, and a protruding portion protruding more axially outwardly than both end surfaces of the outer electrode and having a smaller diameter than the energizing portion, and
    at least an inlet-side end portion of a food flow channel in the energizing portion is provided with a taper portion whose diameter is made small toward the protruding portion.

6. The continuous heat-treating apparatus for food material according to claim 5,
    wherein an end surface of the outer electrode on a food inflow side is positioned opposite the taper portion.

7. The continuous heat-treating apparatus for food material according to claim 1, further comprising:
    an agitating unit continuously and forcibly agitating, in the flow channel, the food material discharged from the main energizing/heating unit;
    a sub energizing/heating unit continuously heating, in the flow channel up to temperature for sterilization, the food material discharged from the agitating unit; and
    a holding unit keeping temperature of the food material while the food material discharged from the sub energizing/heating unit is caused to continuously flow.

8. The continuous heat-treating apparatus for food material according to claim 7,
    wherein the agitating unit has an agitating blade, and the food material is agitated by rotating the agitating blade through an exterior drive source.

9. The continuous heat-treating apparatus for food material according to claim 7,
wherein the agitating unit has a pumping function of forcibly advancing the food material in the flow channel.

10. The continuous heat-treating apparatus for food material according to claim 7,
wherein the agitating unit is a rotary positive displacement pump having a uniaxial eccentric screw.

11. The continuous heat-treating apparatus for food material according to claim 7,
wherein the sub energizing/heating unit has a plurality of ring-like electrodes, and carries a current along a flow direction of the food material.

12. The continuous heat-treating apparatus for food material according to claim 1,
wherein the food material is custard cream or flour paste.

13. An energizing and heating method of heating a food material to be gelatinized by the heating while the food material is conveyed in a food flow channel formed between a cylindrically-shaped outer electrode and a bar-shaped inner electrode placed in the outer electrode, the method comprising:
feeding power to the outer and inner electrodes to energize, in a direction traversing a flow direction of the food material, the food material flowing in the food flow channel;
feeding cooling liquid to an inner cooling flow channel formed in the inner electrode; and
cooling the food material close to the inner electrode up to temperature lower than that of the food material close to a center of the food flow channel.

14. The energizing and heating method according to claim 13, further comprising:
feeding the cooling liquid to an outer cooling flow channel formed in the outer electrode; and
cooling the food material close to the outer electrode up to temperature lower than that of the food material close to the center of the food flow channel.

* * * * *